US009685068B2

(12) United States Patent
Hilliges et al.

(10) Patent No.: US 9,685,068 B2
(45) Date of Patent: Jun. 20, 2017

(54) EMERGENCY NOTIFICATION WITHIN AN ALARM COMMUNITY

(71) Applicant: iRezQ AB, Åkarp (SE)

(72) Inventors: Werner Hilliges, Bottnaryd (SE); Tor Sjödin, Åkarp (SE)

(73) Assignee: iRezQ AB, Åkarp (SE)

( * ) Notice: Subject to any disclaimer, the term of this patent is extended or adjusted under 35 U.S.C. 154(b) by 173 days.

(21) Appl. No.: 14/414,427

(22) PCT Filed: Jul. 8, 2013

(86) PCT No.: PCT/SE2013/050877
§ 371 (c)(1),
(2) Date: Jan. 12, 2015

(87) PCT Pub. No.: WO2014/011106
PCT Pub. Date: Jan. 16, 2014

(65) Prior Publication Data
US 2015/0199895 A1    Jul. 16, 2015

(30) Foreign Application Priority Data

Jul. 13, 2012 (SE) ...................................... 1200439

(51) Int. Cl.
*B60Q 1/00* (2006.01)
*G08B 25/10* (2006.01)
(Continued)

(52) U.S. Cl.
CPC ............... *G08B 25/10* (2013.01); *B60Q 1/00* (2013.01); *G08B 21/043* (2013.01);
(Continued)

(58) Field of Classification Search
None
See application file for complete search history.

(56) References Cited

U.S. PATENT DOCUMENTS

2002/0186146 A1  12/2002  Mikhaylenko
2005/0128062 A1*  6/2005  Lundsgaard ........... G08G 1/205
                                                                         340/436
(Continued)

FOREIGN PATENT DOCUMENTS

DE  10 2007 024 177 A1  12/2008
EP      1 233 387 A2      8/2002
(Continued)

OTHER PUBLICATIONS

Extended European Search Report mailed Apr. 28, 2016, issued in corresponding European Application No. 13816252.4, filed Jul. 8, 2013, 18 pages.
(Continued)

*Primary Examiner* — Julie Lieu
(74) *Attorney, Agent, or Firm* — Christensen O'Connor Johnson Kindness PLLC (57) ABSTRACT

The present invention relates to a process of detecting if a handheld device (10) has been exposed to acceleration above a predetermined threshold by receiving a signal from an accelerometer (13) comprised in the handheld device and comparing the signal from the accelerometer with the predetermined threshold, and if the handheld device have been exposed to acceleration above the predetermined threshold sending, an alarm signal, via a wireless communication unit (16) comprised in the handheld device, to an alarm server, indicating that the handheld device has been subjected for an accident, the process being implemented as a program recorded on a computer-readable recording medium, the program being executed on the handheld device having processing capabilities.

17 Claims, 4 Drawing Sheets

(51) Int. Cl.
  *G08B 25/01* (2006.01)
  *G08G 1/00* (2006.01)
  *G08B 21/18* (2006.01)
  *G08B 21/04* (2006.01)

(52) U.S. Cl.
  CPC ......... *G08B 21/182* (2013.01); *G08B 25/016* (2013.01); *G08G 1/205* (2013.01)

(56) References Cited

U.S. PATENT DOCUMENTS

| | | | |
|---|---|---|---|
| 2007/0276270 A1* | 11/2007 | Tran | A61B 5/0022 600/508 |
| 2009/0128320 A1* | 5/2009 | Needham | G08B 25/014 340/504 |
| 2011/0018736 A1* | 1/2011 | Carr | G08G 1/0965 340/902 |
| 2011/0199216 A1* | 8/2011 | Flinsenberg | A61B 5/1117 340/573.1 |
| 2011/0230791 A1* | 9/2011 | Ten Kate | G08B 21/0446 600/595 |
| 2012/0126997 A1 | 5/2012 | Bensoussan | |
| 2012/0286949 A1* | 11/2012 | Worthington | F16P 3/14 340/539.1 |
| 2013/0054180 A1* | 2/2013 | Barfield | G01P 15/0891 702/138 |
| 2013/0120152 A1* | 5/2013 | Narasimhan | G08B 21/043 340/669 |
| 2014/0201064 A1* | 7/2014 | Jackson | G08G 1/0175 705/38 |
| 2014/0364081 A1* | 12/2014 | Rauner | H04L 12/1895 455/404.2 |
| 2015/0228176 A1* | 8/2015 | Sholder | G08B 21/02 340/539.12 |
| 2016/0140834 A1* | 5/2016 | Tran | G06F 19/3418 340/539.11 |

FOREIGN PATENT DOCUMENTS

| | | |
|---|---|---|
| EP | 1 713 035 A2 | 10/2006 |
| EP | 2 263 533 A1 | 12/2010 |

OTHER PUBLICATIONS

Gutiérrez, R., et al., "Activity Monitoring and Emergency Warning With Location Information of the User," Proceedings of the 2011 IEEE 7th International Symposium on Intelligent Signal Processing (WISP), Floriana, Malta, Sep. 19-21, 2011, 6 pages.

Sposaro, F., and G. Tyson, "iFall: An Android Application for Fall Monitoring and Response," Proceedings of the 31st Annual International Conference of the IEEE EMBS, Minneapolis, Sep. 2-6, 2009, 4 pages.

Viet, V.Q., et al., "Fall Detection Based on Movement and Smart Phone Technology," Proceedings of the 2012 IEEE RIVF International Conference on Computing and Communication Technologies, Research, Innovation, and Vision for the Future (RIVF), Ho Chi Minh City, Vietnam, Feb. 27-Mar. 1, 2012, 4 pages.

International Search Report mailed Jan. 10, 2014, issued in corresponding International Application No. PCT/SE2013/050877, filed Jul. 8, 2013, 6 pages.

\* cited by examiner

EMERGENCY NOTIFICATION WITHIN AN ALARM COMMUNITY

TECHNICAL FIELD

The present invention relates to emergency notification within an alarm community.

BACKGROUND eCall is a European initiative intended to bring rapid assistance to motorists involved in a collision. The eCall initiative aims to deploy a device installed in all road vehicles that will automatically contact the rescue service in the event of a serious road accident, and wirelessly send airbag deployment and shock sensor information, as well as GPS coordinates to a local rescue service. According to some estimates, eCall could speed emergency response times by 40 percent in urban areas and by 50 percent in rural areas.

Thus, in case of accidents happening, especially when road vehicles are involved, it is crucial to send an alarm to a rescue service as soon as possible so that help can arrive at the site of accident. For doing so an emergency notifying apparatus may be employed. Such an emergency notifying apparatus is typically based on one or more shock sensors arranged in the road vehicle. The shock sensors are typically mounted at a forefront and/or rear end of the road vehicle. The shock sensors are also used for deploying airbags locate inside the road vehicle to reduce a shock given to passengers inside the road vehicle and to protect them. Further, the emergency notifying apparatus comprises a position determining system (e.g. a GPS). If the shock sensor detects a shock, the position determining system outputs position and time information of the road vehicle. The information regarding the shock detected by the shock sensor and the information pertaining to position and time are transmitted to an emergency notification control unit located inside the road vehicle. The emergency notification control unit is compiling a notification signal comprising the detected shock, the time and a position of the occurrence of the accident. The notification signal is supplied to a transmission unit (e.g. a mobile phone) and then the transmission unit automatically transmits the notification signal, to an emergency information center via a wireless communication network. The emergency information center checks the occurrence of the accident and its position by means of the received notification signal. Then, the emergency center is arranged to inform a rescue service about the accident. The rescue service may e.g. comprise patrol cars, ambulance cars, fire engines, tow cars and the like.

Such an emergency notifying apparatus is e.g. disclosed in EP 1 233 387. According to EP 1 233 387 the emergency notifying apparatus further comprises cameras capturing images of the road vehicle and its surroundings such that the rescue service may be informed about the site of accident before they arrive.

However, a problem with the emergency notifying apparatuses according to the above are that they are expensive and troublesome to retrofit in existing road vehicles not being equipped with the emergency notifying apparatus at manufacture.

SUMMARY OF THE INVENTION

In view of the above, an objective of the present invention is to provide emergency notification being simple and cheap to implement in road vehicles not being equipped with prior art emergency notifying apparatuses.

In particular, according to a first aspect of the invention a process of detecting if a handheld device has been subjected for an accident is provided. The process being implemented as a program recorded on a computer-readable recording medium, the program being executable on the handheld device having processing capabilities, the handheld device comprising an accelerometer and a wireless communication unit. The process comprising: detecting if the handheld device has been exposed to acceleration above a predetermined threshold by receiving a signal from the accelerometer comprised in the handheld device and comparing the signal from the accelerometer with the predetermined threshold; and if the handheld device has been exposed to acceleration above the predetermined threshold sending, an alarm signal, via the wireless communication unit comprised in the handheld device, to an alarm server, indicating that the handheld device has been subjected for an accident.

The wording accident should be construed as an event when the user of the handheld device has been subjected for danger and most possibly have been injured. Some examples of typical accidents within the context of the present invention are a collision involving one or more road vehicles, a fall of a person mountain climbing, a collision wherein a pedestrian is hit by a road vehicle.

According to the present invention simple and cheap implementation of an emergency notifying apparatus is provided. According to the present invention it has been realized that by using built in sensors, e.g. an accelerometer, in a handheld device, e.g. a smartphone, a PDA, a tablet computer or a handheld game console, and using the output signal from the accelerometer it may be detected if the handheld device, and then most probably the user of the handheld device, has been involved in an accident. Handheld devices comprising accelerometers are today commonly used throughout the society; hence, the hardware of the emergency notifying apparatus suggested according to the present invention is already widely spread and owned by many and accordingly is the implementation of an emergency notifying apparatus both cheap and simple to implement by instructing the hardware of the handheld device to act according to the present invention.

The process may further comprise receiving information regarding an activity mode of the user of the handheld device, wherein the predetermined threshold is set depending on the activity mode of the user of the handheld device. The wording activity mode should be construed as an activity that the user of the handheld device is currently performing. Non-limiting examples of activity modes are driving a car, driving a motorcycle, driving a boat, driving a cycle, walking, skiing, mountain climbing, and acting as a soldier. By receiving information regarding the activity mode of the user of the handheld device and setting the predetermined threshold dependent upon the activity mode, false alarms may be avoided. Accident typically to happen during different activity modes exhibit different acceleration patterns. Such acceleration patterns are well known to the person skilled in the art, e.g. the Swedish insurance company Folksam has collected data pertaining to a vast amount of car crashes.

The process may further comprise receiving, via the wireless communication unit, a verification message from the alarm server asking the user of the handheld device to confirm the accident and sending, to the alarm server and via the wireless communication unit, a response to the verification message. By the use of the verification message false alarms may be avoided.

The sending of a response to the verification message may comprise detecting a simultaneous shaking of the handheld device and a pressing of a button on the handheld device. This is a simple but yet effective way to verify that an alarm is true performable by at least some injured persons not being able to freely control the handheld device.

The process may further comprise determining a type of accident by analyzing characteristics of the signal from the accelerometer of the handheld device. The wording type of accident should be construed as what kind of accident that has occurred. Non-limiting examples of types of accidents are: a front to front collision between two cars, a single vehicle accident where the vehicle is colliding with e.g. a tree, a pedestrian being hit by a car, a rider of a bike falling of the bike, and a person mountain climbing falling. By analyzing the characteristics of the signal from the accelerometer a footprint on the accident causing the signal is found. This footprint may be compared with typical footprint of various types of accidents and from the comparison the type of accident may be determined. This is beneficial since the more information the rescue service arriving at the place may be aware of before actually arriving the better they will be able to provide first aid.

The verifying of that the handheld device have been exposed for acceleration above a predetermined threshold as a response to an accident may be made by analyzing over time a positioning signal from a position determining unit comprised in the handheld device. By utilizing the in the handheld device normally already built in position determining unit, data helping in the verifying of if there has been an accident or not can be deduced. Typically this is made by analyzing the position signal from the position determining unit over time. In case of the position signal is constant over time, i.e. the handheld device does not move over time, this is an indication on that there actually has occurred an accident. However, if the position signal is changing over time, i.e. the handheld device is moving over time, this is an indication on that no accident has occurred.

According to a second aspect of the present invention a method for informing about an accident within an alarm community is provided. The wording alarm community should be construed as a group connected to a network wherein members of the group can be notified when an accident in their vicinity has occurred. The members of the alarm community comprise a plurality of emergency notifying apparatuses, an alarm server and a rescue service. At least one of the emergency notifying apparatuses is a handheld device, wherein the handheld device comprises, an accelerometer, a wireless communication unit and a position determining unit. The method comprises the following acts: detecting if the handheld device has been exposed for acceleration above a predetermined threshold by receiving a signal from the accelerometer comprised in the first handheld device and comparing the signal from the accelerometer with the predetermined threshold; sending, if the handheld device has been exposed for acceleration above the predetermined threshold, an alarm signal, via a wireless communication unit comprised in the first handheld device, to an alarm server; verifying that the handheld device has been exposed for acceleration above a predetermined threshold as a response to an accident; determining a subgroup of members within the alarm community being located within a predetermined distance from the handheld device; and informing the members within the subgroup about the accident.

By implementing the emergency notification acts within the handheld device the same benefits as listed above in connection with the first aspect of the invention is gained. Moreover, by utilizing the built in position determining units of other members of the alarm community, especially members being other handheld devices, a subgroup of members may be chosen such that only these members are informed about the occurred accident. Hence, members of the alarm community being close to the accident may be warned about the accident. Moreover, members of the alarm community may also be informed about the accident so that they can assist with first aid.

Receiving information pertaining to an activity mode of the user of the handheld device may also be performed. By doing so the determining of the subgroup of members may be made dependent upon the activity mode of the user of the handheld device. For example, if the user of the handheld device subjected for the accident has set the activity mode to mountain climbing members of the alarm community having the activity mode of driving a car most probably will not be needed to be informed about an accident involving the handheld device being set in mountain climbing activity mode.

The method may further comprise providing, to the alarm server, medical data pertaining to the user of the handheld device and informing the rescue service about the medical data pertaining to the user of the handheld device. Hence, the rescue service may be informed about medical data of persons possible involved in the accident. This may speed up the first aid given at the scene of the accident.

Furthermore the determining of a sub group of members of the alarm community may be dependent upon data pertaining to medical and or technical skills of a user of a member of the alarm community. Hence, users having medical and or technical skills being of importance in a rescue mission may be chosen to belong to the subgroup.

It is noted that the invention relates to all possible combinations of features recited in the claims.

BRIEF DESCRIPTION OF THE DRAWINGS

These and other aspects of the present invention will now be described in more detail, with reference to appended drawings showing embodiments of the invention. The figures should not be considered limiting the invention to the specific embodiment; instead they are used for explaining and understanding the invention.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and for fully conveying the scope of the invention to the skilled person.

Figure 1:
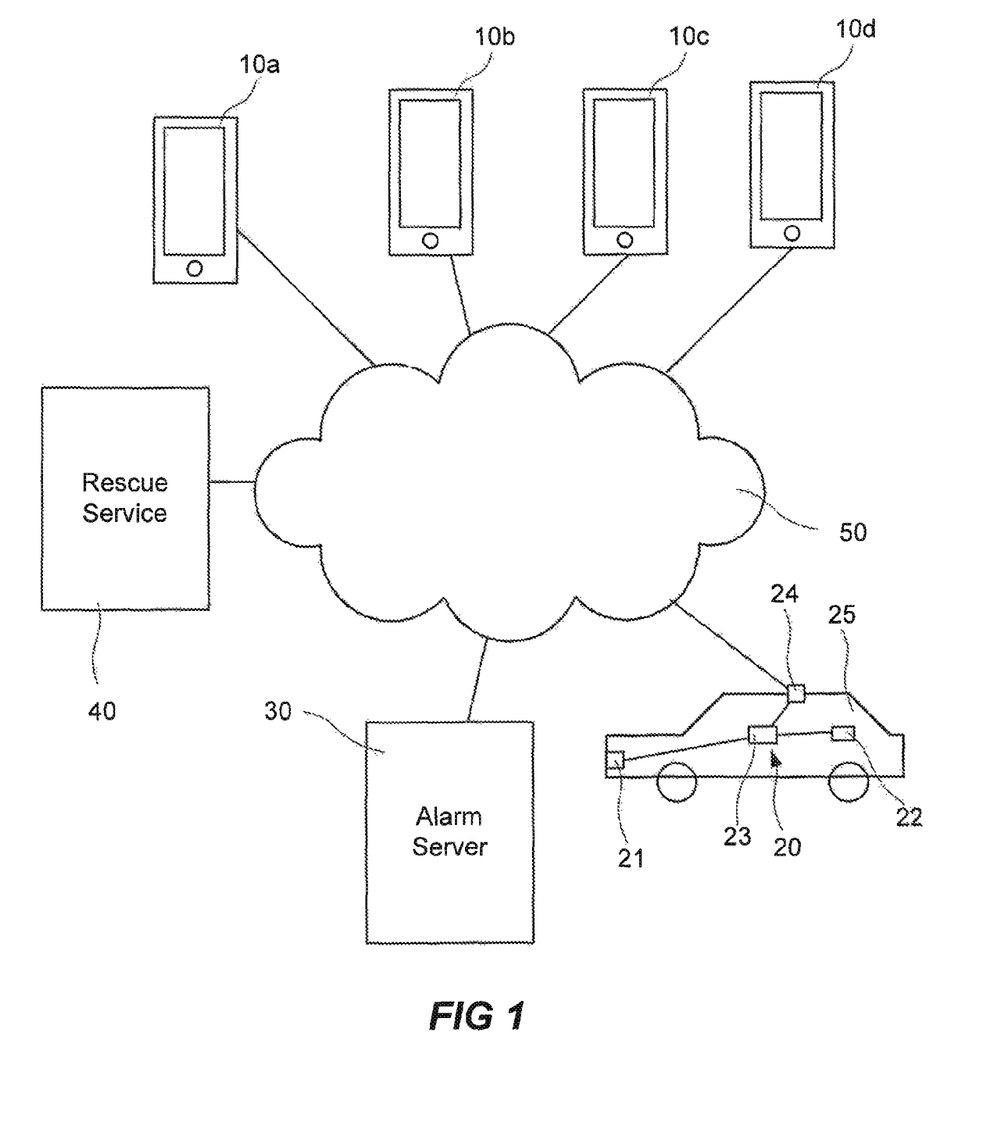
FIG. 1 is a diagram of an exemplary alarm community within which embodiments consistent with the present disclosure may be practiced.

FIG. 1 illustrates an exemplary alarm community within which embodiments consistent with the present disclosure may be practiced. The number and arrangement of components in FIG. 1 is provided for purposes of illustration and, as will be apparent to one of skill in the art from this disclosure, the number of components may be increased or decreased and/or modifications may be made to the arrangement of components, according to the intended needs or objectives of the alarm community.

The alarm community includes a plurality of emergency notifying apparatuses 10a, 10b, 10c, 10d, 20, an alarm server 30 and a rescue service 40 interconnected via a communications network 50. The connections between the components of the alarm community may be any kind of wired or wireless connections. However, the emergency notifying apparatuses 10a, 10b, 10c, 10d, 20 are preferably arranged to communicate with the other components of the alarm community via wireless communication links. Non-limiting examples of wireless communication that may be used are Wi-Fi (e.g. EE 802.11), cellular data service (e.g. GSM, CDMA, GPRS, 3G networks such as W-CDMA, EDGE or CDMA2000 or 4G such as LTE or WiMAX), or mobile satellite communication.

The emergency notifying apparatus 20 located in the road vehicle is an emergency notifying apparatus according to the prior art as discussed above under the background section of this specification. The prior art emergency notifying apparatus 20 comprises a shock sensor 21, a position determining system 22, an emergency notification control unit 23 and a transmission unit 24. For function of the prior art emergency notifying apparatus 20 reference is made to the background section of this specification.

The alarm community includes a plurality of emergency notifying apparatuses 10a, 10b, 10c, 10d arranged according to the present invention. The emergency notifying apparatuses 10a, 10b, 10c, 10d according to the present invention are handheld devices. Non-limiting examples of handheld devices to be used in accordance with the present invention are smart phones, PDA:s, tablet computers or handheld game consoles.

Figure 2:
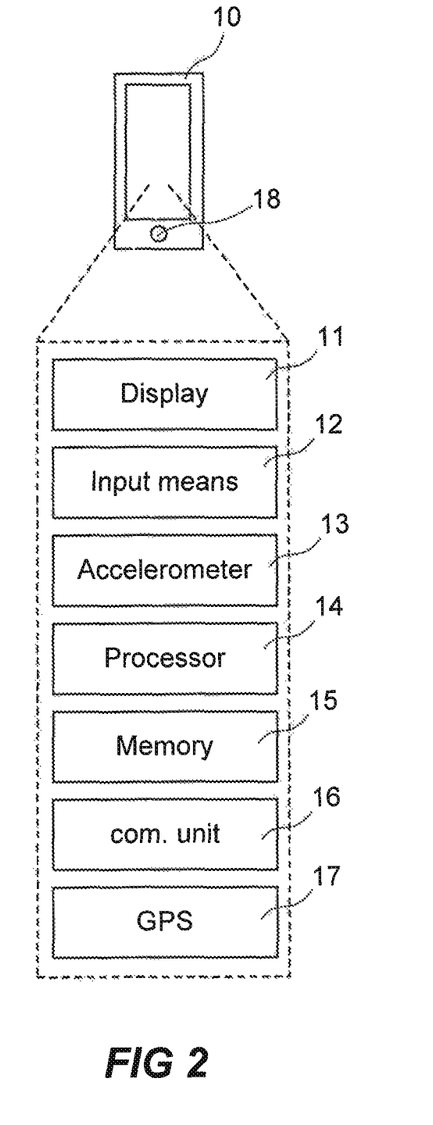
FIG. 2 is a diagram of an exemplary handheld device comprising, a memory having recorded thereon a program which when executed on the handheld device having processing capabilities is arranged for implementing the present invention.

An embodiment of a handheld device 10 used as emergency notifying apparatus 10a, 10b, 10c, 10d according to the present invention is shown in more detail in FIG. 2. According to this embodiment the handheld device 10 is a smart phone. The handheld device 10 comprises a display 11, input means 12, an accelerometer 13, a processor 14, a memory 15, a communication unit 16 and a position determining unit 17.

The display 11 is arranged to display information to a user of the handheld device 10. The display 11 is typically a touch sensitive display 11. If so the display itself may act the input means 12. However, the handheld device 10 may also comprise dedicated input means 12 only used for registering input to the handheld device 10. An example of such a dedicated input means may e.g. be a button 18 arranged on the handheld device 10. Another example of such a dedicated input means may be a key board. However, the handheld device 10 may also or alternatively comprise a key board simulated by the touch sensitive display.

As mentioned above the input means 12, 18 is arranged to register input from the user of the handheld device 10.

The accelerometer 13 is arranged to register an acceleration (speed change) the accelerometer 13 is being exposed for. Moreover, the accelerometer 13 is arranged to output a signal being proportional to the acceleration it is exposed for. According to one embodiment of the present invention the accelerometer 13 is an accelerometer being arranged to measure the acceleration in the three dimensions of space. A way to express the acceleration measured by the accelerometer 13 is to express it as a G-force. This acceleration (or G-force) experienced by an object is due to the vector sum of non-gravitational forces acting on an object free to move. It is accelerations not produced by gravity that are measured by the accelerometer 13. These accelerations cause stresses and strains on objects being exposed for the accelerations. Because of these strains, large g-forces may be destructive.

The position determining unit 17 is arranged to provide location and time information for the handheld device 10. The position determining unit 17 is arranged output a signal comprising information pertaining to the current time and the current location of the handheld device 10. The position determining unit 17 may e.g. be a GPS-unit.

The processor 14 is arranged to process the output signal from the accelerometer 13. For example, the processor 14 is arranged to compare the output signal from the accelerometer 13 with a predetermined threshold. Moreover, the processor 14 is arranged to analyze characteristics of the signal from the accelerometer of the handheld device. Furthermore, the processor 14 is arranged to process the output signal from the position determining unit 17. For example, the processor 14 is arranged to, over time, analyze a positioning signal from the position determining unit 17. Hence, information pertaining to the movement of the handheld device 10 over time may be deduced. This information may be used to find out if the handheld device 10 has moved after an alarm signal has been sent from the handheld device 10. In turn, the information pertaining to the movement of the handheld device 10 may be used to verify if the alarm signal is a true of false alarm signal; this will be discussed in more detail below. The processor 14 is also arranged to process and/or mange outgoing and incoming alarm signals, as will be discussed more in detail below. The processor 14 is also arranged to process and/or mange incoming alarm verification messages; this will also be discussed more in detail below.

The memory 15 is arranged to store information pertaining to predetermined G-force thresholds above which the handheld device 10 is believed to have been subjected to an accident. The memory may be of volatile or a non-volatile type. Further the memory may comprise a plurality of memory units, one of these memory units is a computer-readable recording medium having recorded thereon a program which when executed on the handheld device 10 is arranged for implementing the present invention, details of function of the program recorded on the a computer-readable recording medium will be discussed in more detail below.

The communication unit 16 is arranged to transmit and receive data via the communications network 50. Non-limiting examples of data are: an outgoing alarm signal comprising information pertaining to indication of an occurred accident, the location of the handheld device 10 and time information; a verification message asking the user of the handheld device to confirm the accident; a response to the verification message; mobile phone calls; and incoming alarm messages informing about accidents occurred in the vicinity of the handheld device 10. The communication unit 16 is arranged to communicate via a wireless communication standard. Non-limiting examples of wireless communication that may be used are Wi-Fi (e.g. EE 802.11), cellular data service (e.g. GSM, CDMA, GPRS, 3G networks such as W-CDMA, EDGE or CDMA2000 or 4G such as LTE or WiMAX), or mobile satellite communication.

Figure 3:
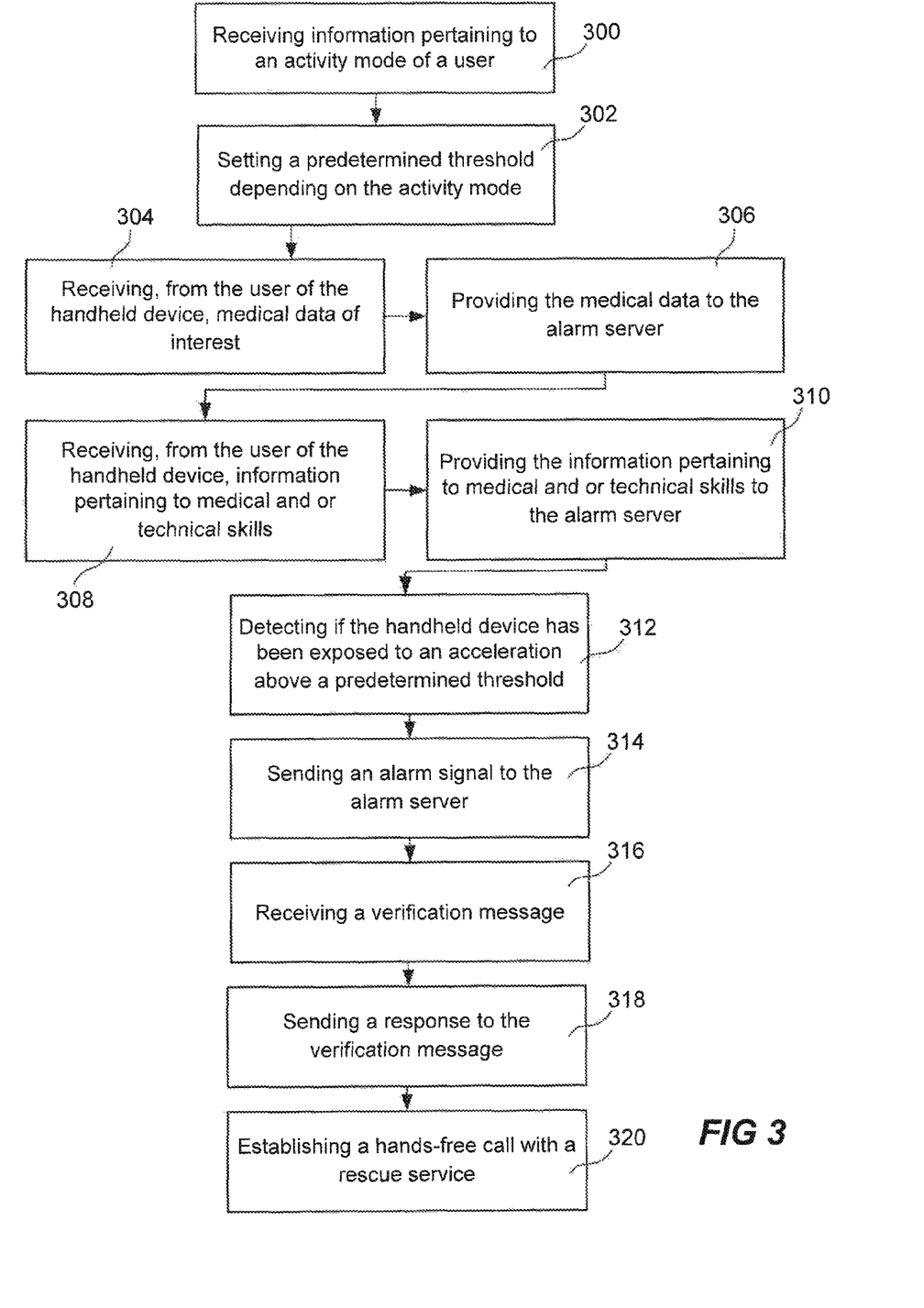
FIG. 3 is a block diagram of an embodiment of a process according to the present invention performed in the handheld device of FIG. 2.

With reference to FIG. 3 a process of how to use the above mentioned handheld device 10 as an emergency notifying apparatus will be described. The below described process of how to use the handheld device 10 as an emergency notifying apparatus is made in connection with the alarm community illustrated in FIG. 1 which illustrates an exemplary alarm community within which embodiments consistent with the present disclosure may be practiced.

The handheld device 10 comprises a computer-readable recording medium having recorded thereon a program which when executed on the handheld device 10 is arranged to perform the acts 300-320 below. The program may be an application downloadable to the handheld device, e.g. being a smartphone, via an application providing service. It is realized that the order of performing the acts are not limited to the order listed below. Moreover, some of the listed acts may be omitted in some implementations or embodiments of the present invention.

Receiving 300 information pertaining to an activity mode of the user of the handheld device 10. The wording activity mode should be construed as an activity that the user of the handheld device 10 is currently performing. Non-limiting examples of activity modes are driving a car, driving a motorcycle, driving a boat, driving a cycle, walking, skiing, mountain climbing, and acting as a soldier. The information pertaining to an activity mode may be received by user inputting to the handheld device 10 via the input means 12 of the handheld device 10. Alternatively, or in combination, the information pertaining to an activity mode may be received by interpreting the output signal from the accelerometer 13 of the handheld device 10. This may e.g. be made by recording the output signal from the accelerometer 13 of the handheld device 10 during different activity modes and comparing the present situation with the recorded different activity modes in order to find a match.

Setting 302 a predetermined threshold depending on the activity mode of the user of the handheld device 10. By setting the predetermined threshold depending on the activity mode it is ensured that the accident detection performed by the handheld device 10 is well adapted to situation wherein the user of the handheld device 10 currently is. For example the acceleration pattern in a car crash is very much different from the acceleration pattern falling during mountain climbing or when being hit by a vehicle out walking.

Receiving 304, from the user of the handheld device 10, medical data of interest in case of an accident wherein the user of the handheld device 10 is involved. Providing 306 the medical data to the alarm server 30. Non-limiting examples of such medical data are: blood type; diseases such as diabetes, HIV, asthma, etc., use of medicine such as blood thinner, etc., or allergies, such as allergy for anesthetics, antibiotics, etc.

Receiving 308, from the user of the handheld device 10, information pertaining to medical and or technical skills. Providing 310 the information pertaining to medical and or technical skills to the alarm server 30. Non-limiting examples of information pertaining to medical and or technical skills are: the user being a medical doctor; a nurse; a fire fighter; a priest etc.

Detecting 312 if the handheld device 10 has been exposed to acceleration (G-force) above a predetermined threshold. This is done by receiving a signal from the accelerometer 13 comprised in the handheld device 10 and comparing the signal from the accelerometer 13 with the predetermined threshold. The comparison between the signal from the accelerometer 13 and the predetermined threshold is made momentarily. Alternatively, or in combination, the signal from the accelerometer 13 is processed over time, e.g. integrated, and thereafter compared with the predetermined threshold.

In a typical car accident the G-force amounts to an average of 6G for about 80-100 ms. Max G-force during the accident is typical 16G. By integrating the signal from the accelerometer 13 over time it may hence be determined if there has be an accident. It is also common that the accident involves a rapid change in velocity of 20 km/h. For example if the cruising speed is 80 km/h a typical pattern for an accident is a sudden decrease in speed down to 60 km/h and subsequently an abrupt stop to standing still.

Moreover, it is interesting to compare the position when the alarm occurred with the position precisely before and after the alarm. By doing so, it will be possible to determine the traveling direction before and after the alarm. Hence, it may be deduced on which side of the freeway, motorway, highway or other kind of road the accident has occurred.

Sending 314, if the handheld device 10 has been exposed to acceleration (G-force) above the predetermined threshold, an alarm signal to the alarm server 30. The alarm signal comprising information pertaining to indication of an occurred accident, the location of the handheld device 10 and time information, wherein the location of the handheld device 10 and time information are received from the position determining unit 17 comprised in the handheld device 10. The alarm signal is sent via the wireless communication unit 16 comprised in the handheld device 10.

Receiving 316 a verification message asking the user of the handheld device 10 to confirm the accident. The verification message is sent from the alarm server 30. The verification message is received via the wireless communication unit 16 comprised in the handheld device 10. A response time for responding to the verification message may be set. Typically such a response time is set in the order of seconds. According to an embodiment of the present invention the response time is set to 10 seconds.

Sending 318 a response to the verification message. The response to the verification message is sent to the alarm server 30. The response to the verification message is sent via the wireless communication unit 16. Optionally, the sending of a response to the verification message may comprises detecting a simultaneous shaking of the handheld device 10 and a pressing of a button 18 on the handheld device 10.

Via the acts of receiving 316 a verification message and sending 318 a response to the verification message false alarms may be avoided.

Establishing 320 a hands-free call with a rescue service 40. This will simplify communication with the rescue service 40 since the user will be able to talk straight into the air in case of an occurred accident. A non-limiting example of a hands-free call is to connect the handheld device to external microphone and speakers. The connection may e.g. be made via Bluetooth.

Figure 4:
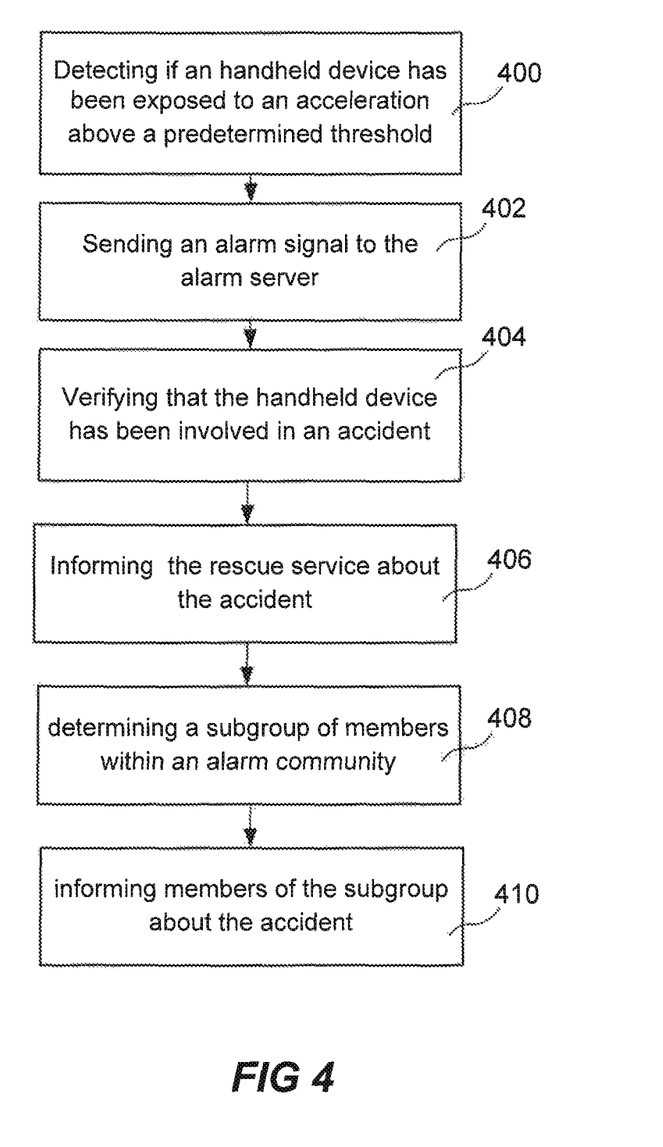
FIG. 4 is a block diagram of an embodiment of method according to the present invention for informing about an accident within an alarm community.

With reference to FIG. 4 an embodiment of method according to the present invention for informing about an accident within an alarm community is illustrated. An example of an alarm community wherein the method may be implemented is illustrated in FIG. 1. The alarm community having a plurality of members comprising a plurality of emergency notifying apparatuses, wherein at least one of the emergency notifying apparatuses is a handheld device, an alarm server and a rescue service. The handheld device comprises: an accelerometer, a wireless communication unit and a position determining unit.

In connection with the description of the method according to the present invention for informing about an accident within an alarm community it is assumed that medical data and information pertaining to medical and or technical skills pertaining to the users of the emergency notifying apparatuses 10a, 10b, 10c, 10d, 20 are stored in the alarm server 30. This is made in accordance with the acts receiving 304 medical data and providing 306 the medical data to the alarm server 30 and in accordance with the acts receiving 308 information pertaining to medical and or technical skills and providing 310 the information pertaining to medical and or technical skills to the alarm server 30 listed above.

The method for informing about an accident within an alarm community comprises the acts listed below. An embodiment of a handheld device 10 being a member of the alarm community is illustrated in FIG. 2. For the function of such a handheld device reference is made to the description above.

Detecting 400 if an handheld device within the alarm community devices has been exposed for an acceleration (G-force) above a predetermined threshold. This is done by receiving a signal from the accelerometer comprised in the handheld device and comparing the signal from the accelerometer with the predetermined threshold. The comparison between the signal from the accelerometer and the predetermined threshold is made momentarily. Alternatively, or in combination, the signal from the accelerometer is processed over time, e.g. integrated, and thereafter compared with the predetermined threshold.

Sending 402, if the first handheld device has been exposed to acceleration (G-force) above the predetermined threshold, an alarm signal to the alarm server. The alarm signal comprising information pertaining to indication of an occurred accident, the location of the handheld device and time information, wherein the location of the handheld device and time information are received from the position determining unit comprised in the handheld device. The alarm signal is sent via the wireless communication unit comprised in the handheld device.

Verifying 404 that the handheld device has been exposed for acceleration (G-force) above a predetermined threshold as a response to an accident. The verifying may comprise data processing of the signal from the accelerometer comprised in the first handheld device. By analyzing the characteristics of the signal from the accelerometer a footprint on the event causing the output signal from the accelerometer is found. This footprint may be compared with typical footprint of various types of accidents and from the comparison it may be found if it was an accident. Moreover, also the type of accident may be determined. Accordingly, by analyzing characteristics of the signal from the accelerometer of the handheld device the type of accident may be determined.

Further, the verifying may comprise data processing of a positioning signal from a position determining unit comprised in the first handheld device. Typically this is made by analyzing the position signal from the position determining unit over time. In case of the position signal is constant over time, i.e. the handheld device does not move over time, this is an indication on that there actually has occurred an accident. However, if the position signal is changing over time, i.e. the handheld device is moving over time, this is an indication on that no accident has occurred.

Informing 406 the rescue service about the verified accident. The rescue service is informed about where the accident occurred, the G-forces involved in the accident, the activity mode of the handheld device involved in the accident, and medical data pertaining to the user of the handheld device.

Hence, when, by the handheld device, an excessive and dangerous G-force has been measured an alarm signal is sent to alarm server. The alarm server is arranged to contact the handheld device by a verification message asking for verification that an accident actually occurred. If the user of the handheld device does not answer, if the user of the handheld device acknowledge that the accident actually occurred, or if the accident is verified by analyzing the signals from the accelerometer and/or the position determining unit a sharp alarm is sent to a rescue service. The sharp alarm comprises information pertaining to where the accident occurred, the G-forces involved in the accident, the activity mode of the handheld device involved in the accident, and medical data pertaining to the user of the handheld device.

The method further comprises determining 408 a subgroup of members within the alarm community. The members of the subgroup of the alarm community are located within a predetermined distance from the first handheld device. The predetermined distance is chosen such that only members of the alarm community being affected by the accident are chosen. For example, the predetermined distance is chosen such that only members of the alarm community traveling on the same road as the road where the accident has occurred are determined as members of the subgroup. Moreover, the determining 408 of the subgroup of members may be dependent upon the activity mode of the user of the handheld device being subjected for the accident. For example, if the user of the handheld device subjected for the accident has set the activity mode to mountain climbing members of the alarm community having the activity mode of driving a car most probably will not be needed to be informed about an accident involving the handheld device being set in mountain climbing activity mode.

Furthermore the determining 408 of a sub group of members of the alarm community may be dependent upon the data pertaining to medical and or technical skills of a user of a member of the alarm community. Hence, users having medical and or technical skills being of importance in a rescue mission may be chosen to belong to the subgroup.

The method further comprises informing 410 the emergency notifying apparatuses within the subgroup of members of the alarm community about the accident. Hence, the users of the emergency notifying apparatuses within the subgroup of members of the alarm community may be informed about the accident. The information sent to the members within the subgroup may comprise where the accident occurred, the activity mode of the handheld device involved in the accident and medical data pertaining to the user of the handheld device. Moreover, the informing 410 of the members within the subgroup about the accident may also comprise setting the emergency notifying apparatuses, of subgroup of handheld devices in a tactile mode, a sound mode or a visual mode so that the user of the emergency notifying apparatus may be warned by a tactile, an audio or visual indication that information pertaining to an accident has been received.

Hence, according to the present invention the occurrence of an accident is detected via a handheld device, e.g. a smartphone, and its built-in sensors. When detection of an accident has been made an authentication/verification to determine that the automatic detection is not false is made.

Thereafter a contact with a rescue service is made. Moreover, also members of the alarm community comprising a subgroup of the emergency notifying apparatuses are informed about the accident. The members of the alarm community chosen to be informed are chosen based on physical proximity to the site of accident. The members of the group are contacted either to warn about the accident site (e.g. to make a detour) or assist with first aid. The choice of if contacting members of the alarm community or not and the choice of which members of the alarm community to contact may be made either by the alarm server or by the rescue service. Furthermore, medical information pertaining to the user of the handheld device sending the alarm is sent to the rescue service in order to aid in their work.

The person skilled in the art realizes that the present invention by no means is limited to the preferred embodiments described above. On the contrary, many modifications and variations are possible within the scope of the appended claims.

For example, the alarm community may in addition to emergency notifying apparatuses in the form of handheld devices also comprise one or more emergency notifying apparatuses 20 located in road vehicles, an example of such an emergency notifying apparatus 20 is illustrated in FIG. 1.

Moreover, the communication within the alarm community may be fully or partly encrypted.

Furthermore, the processor 14 of the handheld device 10 may be arranged to perform a detailed analysis of the user's normal behavior. By learing the user's normal behavior the handheld device 10 may be arranged to send an alert if something happens considered abnormal. A possible way of implementing this is to use artificial intelligence (AI).

Accordingly additionally, variations to the disclosed embodiments can be understood and effected by the skilled person in practicing the claimed invention, from a study of the drawings, the disclosure, and the appended claims. Moreover, in the drawings and specification, there have been disclosed preferred embodiments and examples of the invention and, although specific terms are employed, they are used in a generic and descriptive sense only and not for the purpose of limitation, the scope of the invention being set forth in the following claims. In the claims, the word "comprising" does not exclude other elements or steps, and the indefinite article "a" or "an" does not exclude a plurality.

The invention claimed is:

1. A method for informing about an accident within an alarm community having a plurality of members comprising a plurality of emergency notifying apparatuses, wherein at least one of the emergency notifying apparatuses is a handheld device, an alarm server and a rescue service, wherein the handheld device comprises, an accelerometer, a wireless communication unit and a position determining unit, the method comprising:
   detecting if the handheld device has been exposed for acceleration above a predetermined threshold by receiving a signal from the accelerometer comprised in the handheld device and comparing the signal from the accelerometer with the predetermined threshold;
   sending, if the handheld device has been exposed for acceleration above the predetermined threshold, an alarm signal, via a wireless communication unit comprised in the first handheld device, to the alarm server;
   verifying that the handheld device has been exposed for acceleration above a predetermined threshold as a response to an accident;
   determining a subgroup of members within the alarm community being located within a predetermined distance from the handheld device;
   informing the members within the subgroup about the accident; and
   receiving information pertaining to an activity mode of the user of the handheld device, wherein the predetermined threshold is set depending on the activity mode of the user of the handheld device.

2. The method according to claim 1, further comprising receiving information pertaining to an activity mode of the user of the handheld device, wherein the determining of the subgroup of members is dependent upon the activity mode of the user of the handheld device.

3. The method according to claim 1, wherein the verifying that the handheld device has been exposed for acceleration above a predetermined threshold as a response to an accident comprises data processing over time of the signal from the accelerometer comprised in the first handheld device.

4. The method according to claim 1, wherein the verifying that the handheld device has been exposed for acceleration above a predetermined threshold as a response to an accident comprises data processing of a positioning signal from a position determining unit comprised in the handheld device.

5. The method according to claim 1, further comprising providing, to the alarm server, medical data pertaining to the user of the handheld device.

6. The method according to claim 1, further comprising informing the rescue service about the accident.

7. The method according to claim 1, further comprising providing, to the alarm server, medical data pertaining to the user of the handheld device, informing the rescue service about the accident and informing the rescue service about the medical data pertaining to the user of the handheld device.

8. The method according to claim 1, further comprising providing, to the alarm server, data pertaining to medical and or technical skills of a user of an emergency notifying apparatus of the alarm community.

9. The method according to claim 8, wherein determining a sub group of members is dependent upon the data pertaining to medical and or technical skills of the user of the emergency notifying apparatus.

10. A method for informing about an accident within an alarm community having a plurality of members comprising a plurality of emergency notifying apparatuses, wherein at least one of the emergency notifying apparatuses is a handheld device, an alarm server and a rescue service, wherein the handheld device comprises, an accelerometer, a wireless communication unit and a position determining unit, the method comprising:
   detecting if the handheld device has been exposed for acceleration above a predetermined threshold by receiving a signal from the accelerometer comprised in the handheld device and comparing the signal from the accelerometer with the predetermined threshold;
   sending, if the handheld device has been exposed for acceleration above the predetermined threshold, an alarm signal, via a wireless communication unit comprised in the first handheld device, to the alarm server;
   verifying that the handheld device has been exposed for acceleration above a predetermined threshold as a response to an accident;
   determining a subgroup of members within the alarm community being located within a predetermined distance from the handheld device;

informing the members within the subgroup about the accident; and receiving information pertaining to an activity mode of the user of the handheld device, wherein the determining of the subgroup of members is dependent upon the activity mode of the user of the handheld device.

11. The method according to claim 10, wherein the verifying that the handheld device has been exposed for acceleration above a predetermined threshold as a response to an accident comprises data processing over time of the signal from the accelerometer comprised in the first handheld device.

12. The method according to claim 10, wherein the verifying that the handheld device has been exposed for acceleration above a predetermined threshold as a response to an accident comprises data processing of a positioning signal from a position determining unit comprised in the handheld device.

13. The method according to claim 10, further comprising providing, to the alarm server, medical data pertaining to the user of the handheld device.

14. The method according to claim 10, further comprising informing the rescue service about the accident.

15. The method according to claim 10, further comprising providing, to the alarm server, medical data pertaining to the user of the handheld device, informing the rescue service about the accident, and informing the rescue service about the medical data pertaining to the user of the handheld device.

16. The method according to claim 10, further comprising providing, to the alarm server, data pertaining to medical and or technical skills of a user of an emergency notifying apparatus of the alarm community.

17. The method according to claim 10, wherein determining a sub group of members is dependent upon the data pertaining to medical and or technical skills of the user of the emergency notifying apparatus.

* * * * *